(12) United States Patent
Eminovici

(10) Patent No.: US 7,873,626 B2
(45) Date of Patent: Jan. 18, 2011

(54) METHOD AND SYSTEM FOR A PATTERN MATCHING ENGINE

(75) Inventor: Vlad Eminovici, Redmond, WA (US)

(73) Assignee: Microsoft Corporation, Redwood, CA (US)

( * ) Notice: Subject to any disclaimer, the term of this patent is extended or adjusted under 35 U.S.C. 154(b) by 190 days.

(21) Appl. No.: 11/837,881

(22) Filed: Aug. 13, 2007

(65) Prior Publication Data

US 2008/0177737 A1 Jul. 24, 2008

Related U.S. Application Data

(63) Continuation of application No. 10/177,087, filed on Jun. 21, 2002, now Pat. No. 7,257,576.

(51) Int. Cl.
G06F 17/00 (2006.01)

(52) U.S. Cl. .................. 707/711; 707/714; 707/721; 707/731

(58) Field of Classification Search ............ 707/711, 707/714, 721, 731
See application file for complete search history.

(56) References Cited

U.S. PATENT DOCUMENTS

| | | | |
|---|---|---|---|
| 4,882,699 A | 11/1989 | Evensen | |
| 5,761,440 A | 6/1998 | De Marco et al. | |
| 5,995,971 A | 11/1999 | Douceur et al. | |
| 6,041,053 A | 3/2000 | Douceur et al. | |
| 6,411,952 B1 * | 6/2002 | Bharat et al. | 707/5 |
| 6,701,369 B1 | 3/2004 | Philyaw | |
| 6,738,779 B1 | 5/2004 | Shapira et al. | |
| 6,785,677 B1 | 8/2004 | Fritchman | |
| 7,257,576 B2 | 8/2007 | Eminovici | |
| 2003/0125931 A1 | 7/2003 | Campbell | |
| 2003/0204703 A1 | 10/2003 | Rajagopal et al. | |

* cited by examiner

*Primary Examiner*—Sana Al-Hashemi
(74) *Attorney, Agent, or Firm*—Perkins Coie LLP

(57) ABSTRACT

A system and method directed to a matching engine for finding the best match for an input string from among a group of predefined string patterns is disclosed. The predefined patterns may include one or more wildcard characters. A metric value is computed for every predefined string pattern. If the input string matches more than one predefined pattern, then the pattern with the highest metric value is determined as the best match to the input string. Additionally, information of different types may be attached to the predefined patterns and used for further processing of information, for example, to make routing decisions or to run a program module.

16 Claims, 8 Drawing Sheets

METHOD AND SYSTEM FOR A PATTERN MATCHING ENGINE

CROSS-REFERENCE TO RELATED APPLICATION(S)

This application is a continuation of U.S. patent application Ser. No. 10/177,087 entitled "METHOD AND SYSTEM FOR A PATTERN MATCHING ENGINE," filed Jun. 21, 2002, now U.S. Pat. No. 7,257,576 issued Aug. 14, 2007, which application is hereby incorporated by reference in its entirety.

TECHNICAL FIELD

This invention relates generally to a pattern matching engine and more specifically to a matching engine to match a string of characters to one or more defined string patterns.

BACKGROUND OF THE INVENTION

In many applications, there is often a need to compare and or match strings of characters to one another. In a typical scenario, a user may have a string pattern that he wants to compare to many different strings of characters. For example, a user may have a list of file names and will want to search the file names for the pattern "ab*.txt", wherein the character "*" is a wildcard character representing an unknown string of characters comprised of as many as zero to an unlimited number of characters. A search engine may go through the list of characters sequentially to determine which of the strings match the user selected pattern. Thus, in this typical matching engine, it is a user selected pattern that is being compared and matched to one or more character strings. Moreover, this typical matching engine will find all strings that match the pattern and is not able to qualitatively or quantitatively differentiate between the strings that match the pattern.

There remains the need, however, for a matching engine that will allow an input string to be compared and matched to a group of predefined string patterns. Such a matching engine should be able to determine, for a given input string, which group of predefined pattern strings match the input string, and of these predefined patterns which is the pattern that is most similar to the input string (i.e., the best matching pattern). Such a matching engine has many different uses, for example, it can be used in scenarios that involve making decisions based on information attached to a particular pattern. Thus, when the best pattern match to a given input string is found, information attached to the pattern can be used to take further action. In one implementation, for example, the matching engine may be implemented in a Session Initiation Protocol (SIP) server to make routing decisions.

SUMMARY OF THE INVENTION

The present invention is directed to a matching engine for finding the best match for an input string from a group of defined string patterns. The predefined patterns may include one or more wildcard characters that could represent a string of any length of characters, including no characters at all.

Generally, if a pattern is identical to an input string it is the best matching pattern. If a pattern is not identical to an input string and the pattern does not include any wildcard "*" characters, the pattern does not match the input string. If a pattern includes at least one wildcard character, techniques well known to those with ordinary skill in the art exist to determine if the pattern matches the input string.

The present invention is directed to a method and system for computing a metric value for each pattern. The metric value can then be used to determine which pattern best matches the input string from among all patterns that match the input string. Generally, the higher the metric value of the pattern, the better match it is to the input string.

The metric value of a pattern is computed by dividing the pattern into one or more substrings. Each substring is comprised of one or more contiguous characters separated from other characters by a wildcard "*" character. The value of each substring is computed by counting the number of characters in each substring. The metric value of the pattern is computed by adding the values of all the substrings comprising the pattern. If the pattern does not include any wildcard characters, then the metric value of the pattern is equal to twice the value of the length of the pattern.

Additionally, information of different types may be attached to the patterns. Accordingly, when the best pattern is found from among a group of string patterns, the information attached to the pattern may be provided to a user. Any type of information may be attached to the pattern. For example, the information attached to the pattern may be used to make a routing decision or to run a specific program module or the like.

BRIEF THF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
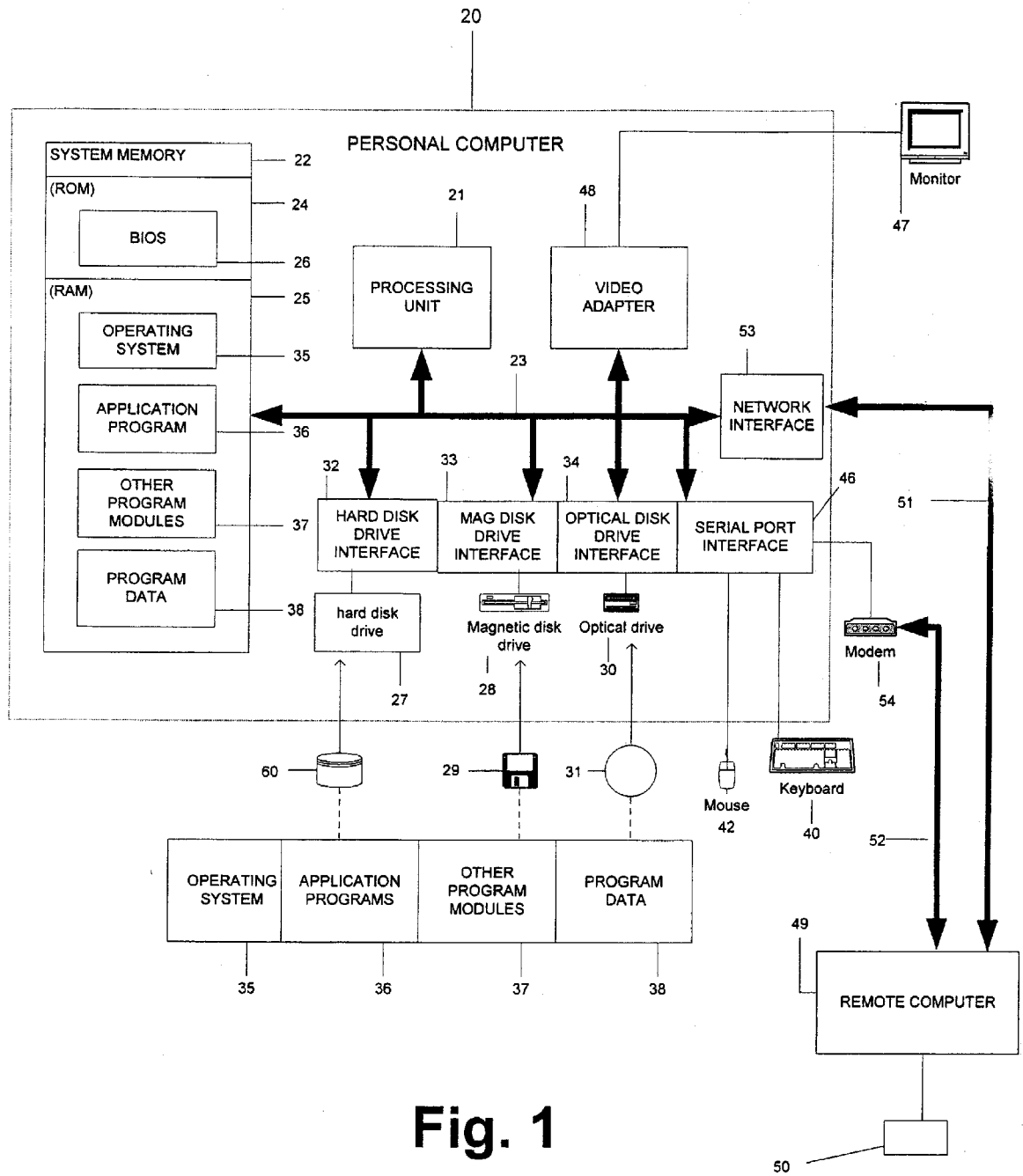
FIG. 1 is a block diagram of an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer and/or server. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. Additionally, the computer 20 may act as a server computer to one or more remote computers 49. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
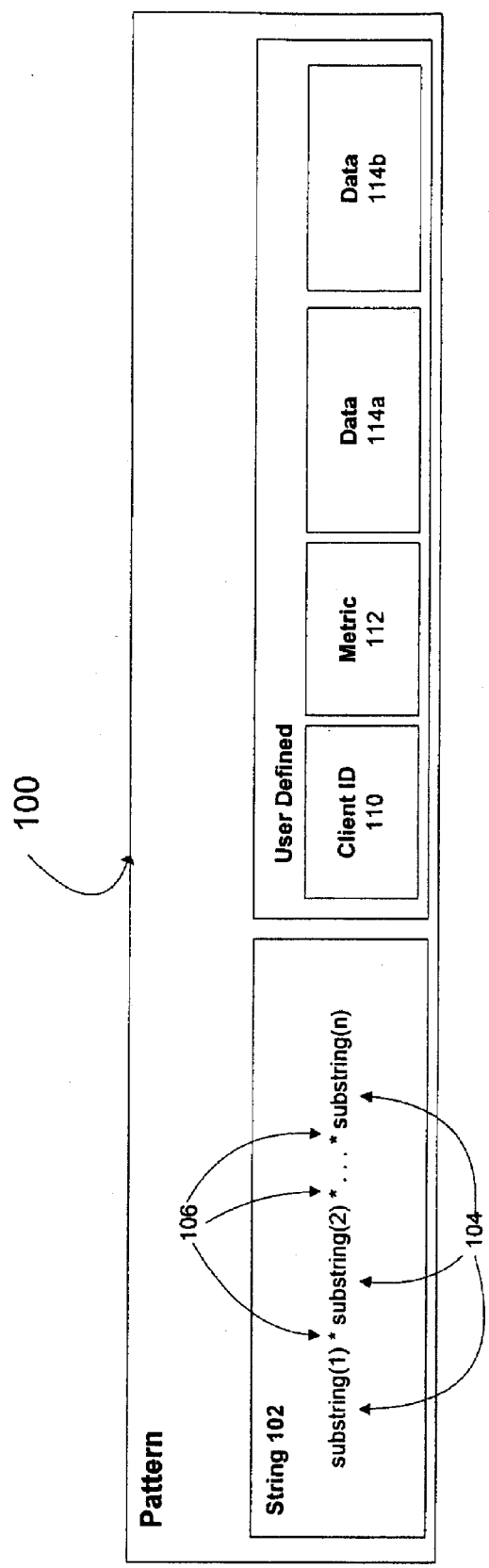
FIG. 2 is a block diagram of the structure of a predefined string pattern.

FIG. 2 is a block diagram of the structure of the patterns to which an input string may be compared. The pattern 100 is comprised of a string of characters 102. The string 102 may be comprised of one or more substrings 104. Each substring 104 may be comprised of one or more contiguous characters separated from other characters by a wildcard "*" character 106. It is also possible for the string 102 to include no wildcard characters. Although not specifically shown in FIG. 2, the string 102 may commence and/or end with a wildcard 106, i.e., the wildcard character does not necessarily have to be in the middle of the string. The concept of a wildcard is well known to those with ordinary skill in the art. Specifically, the wildcard character 106 represents an undefined string that represents anything from zero to an unlimited number of characters.

Figure 3:
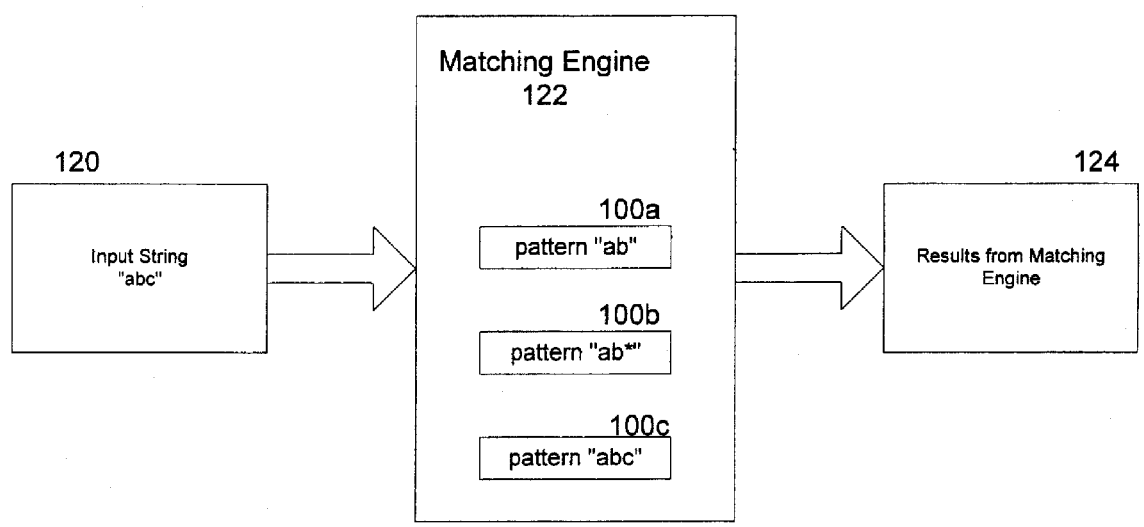
FIG. 3 is a block diagram representing a matching engine.

FIG. 3 is a block diagram representation of the matching engine according the present invention. An input string 120 is inputted by a user for comparison to one or more predefined patterns 100 by the matching engine 122. The input string 120 may be inputted by any user, e.g., a human, a process, another routine or program, a server, etc. For purposes of illustration, the input string 120 consists of the characters "abc". Also for purposes of illustration, assume that the pattern strings 100 consist of "ab" 100a, "ab*" 100b, and "abc" 100c. Similarly, the predefined patterns 100 may be created in any appropriate or desired manner, e.g., a human, a process, another routine or program, etc. It is to be understood that the invention is broad enough to apply to any input string of characters and any string patterns. For example, in an SIP server implementation, the string patterns are generally in a form of "user@host".

The matching engine 120 uses a metric value to determine which of the patterns is the best match for the input string 120. As shown in FIG. 2, we can consider a pattern 100 to be comprised of one or more substrings 104 separated by the wildcard character "*" 106 such that:

Pattern=substring$_1$*substring$_2$* . . . *substring$_n$

Each substring may contain any character other than the wildcard character "*". If we consider $l_i$ as the length in characters for substring$_i$, and $l_p$ as the length in characters of the entire pattern including any wildcard characters, then it is always true that $l_p >= l_{i1} + l_{i2} + \ldots + l_{in}$ The two sides of the equation above are equal only when there is no wildcard character "*" included in the pattern. In one embodiment, a pattern that exactly matches the input string should be considered to be a better match than a matching pattern that includes at least one wildcard character. Accordingly, if the pattern does not include any wildcard characters, then the metric value ($m_p$) of the pattern is:

$m_p = 2 \times l_p$

If the pattern does contain one or more wildcard characters, then the metric value of the pattern is:

$m_p = l_{i1} + l_{i2} + \ldots + l_{in}$

Accordingly, in one embodiment, a pattern that exactly matches an input string always has a higher metric value than a pattern that includes at least one wildcard character because:

$2 \times l_p > l_{i1} + l_{i2} + \ldots + l_{in}$

Figure 4:
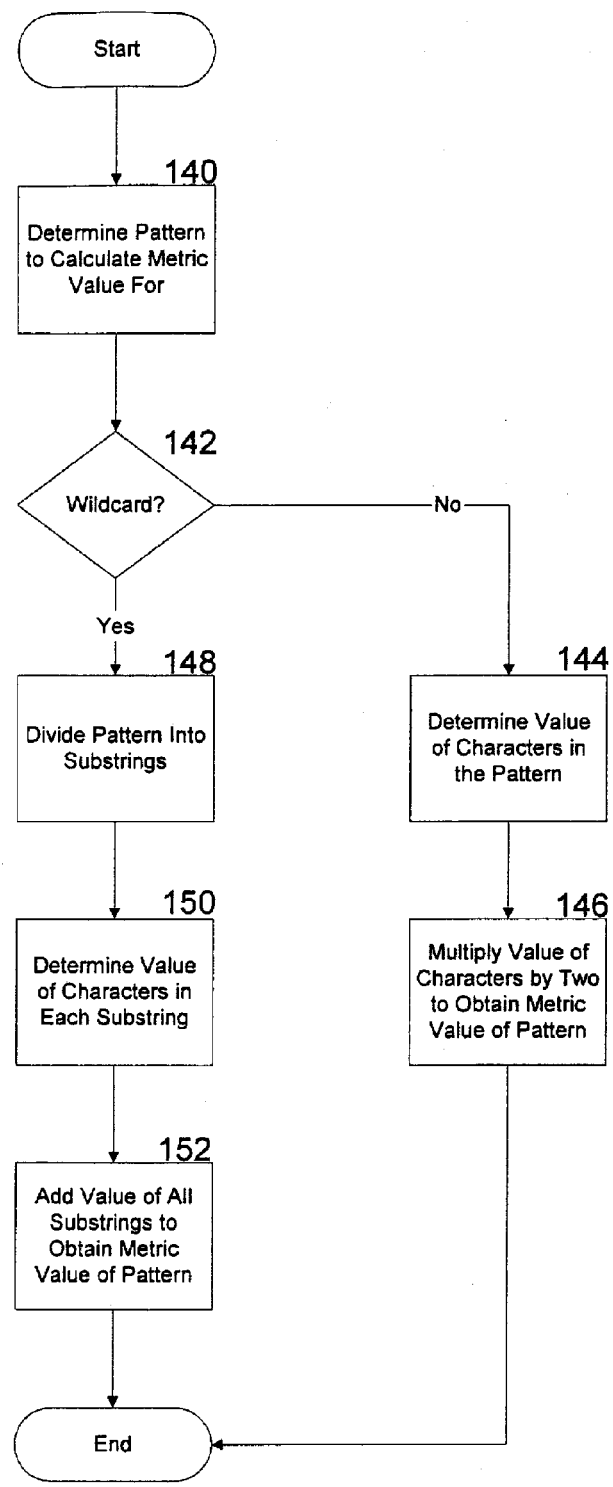
FIG. 4 is a flow chart of the steps performed to calculate a metric value for a pattern.

The specific steps of computing the metric value of a pattern are discussed with reference to FIG. 4. At step 140, the predefined pattern for which a metric value is to be computed is determined. At step 142, it is determined whether the predefined pattern has any wildcard characters 106. If the predefined pattern does not have any wildcards, then at step 144 the value of the characters in the pattern is determined. One method of determining the value of the characters is to count the number of characters in the pattern. At step 146, the metric value of the pattern is determined by multiplying the value of the string by two. If at step 142 the pattern does have at least one wildcard, then at step 148 the pattern is divided into substrings. Each substring 104 is comprised of one or more contiguous characters that are separated from other characters by a wildcard. At step 150 the value of each substring is determined by counting the number of characters in each substring. And at step 152 the metric value of the pattern is calculated by adding together the value of each substring. The metric value of the patterns may be computed by the matching engine 122 or by any other appropriate process, routine, module or the like.

Figure 5:
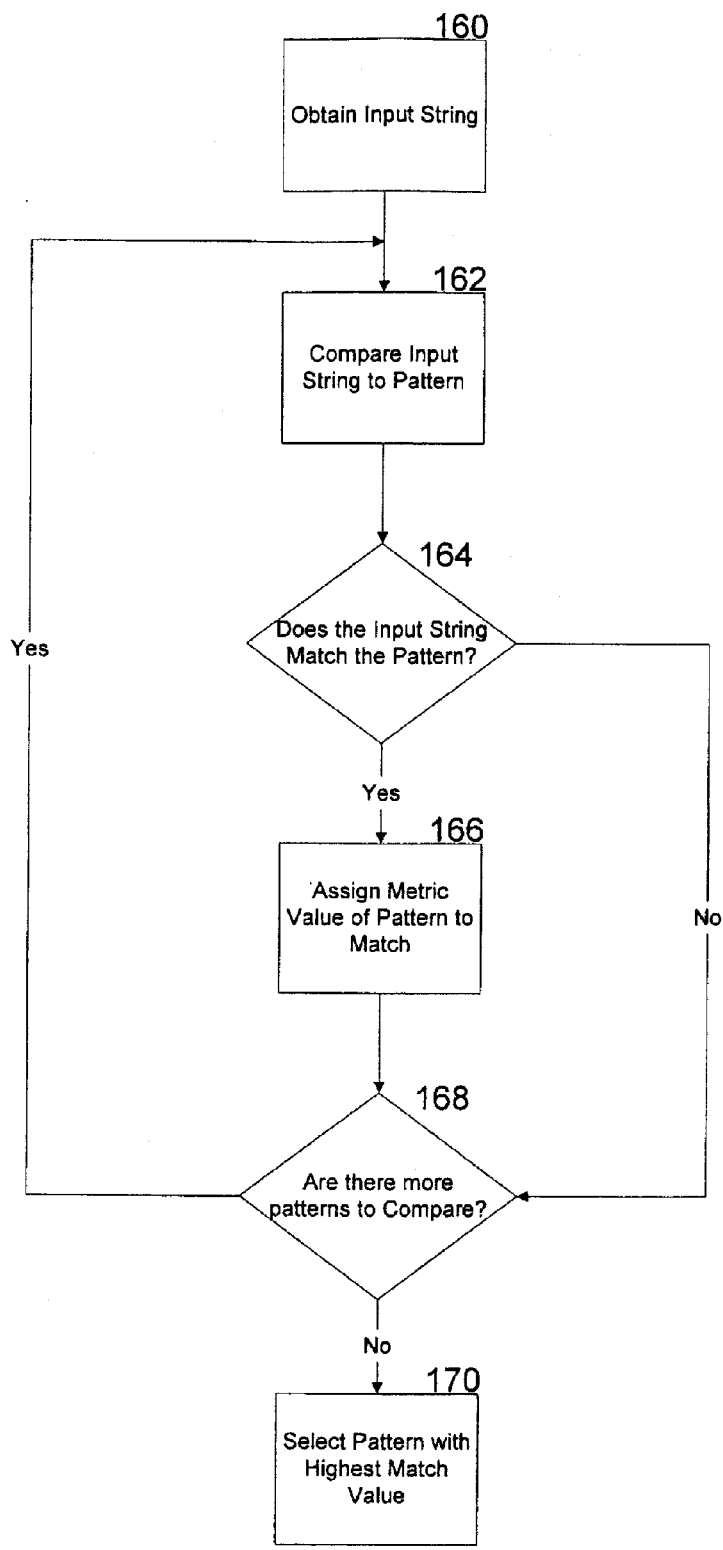
FIG. 5 is a flow chart of the steps performed by a matching engine to determine the pattern that best matches an input string.

The operation of the matching engine is further discussed with respect to the flowchart of FIG. 5. At step 160 an input string is received by the matching engine 122. At step 162 the matching engine compares the input string to one of the predefined patterns. In one embodiment, this comparison is accomplished by performing an operation to determine if the two strings are equal. Techniques for performing this comparison, even when one of the strings includes one or more wildcard "*" characters, are well-known to those with ordinary skill in the art.

If at step 164 the input string matches the predefined pattern, then at step 166 the metric value of the pattern is assigned as the value of the match between the string and the pattern. If at step 164 the input string does not match the predefined pattern, then at 168, the matching engine 122 determines if there are any other predefined patterns that should be compared to the input string. Once the input string has been compared to all of the predefined patterns that it should be compared to, at step 170 the matching engine selects the pattern that had the highest match value with the input string.

In the example of FIG. 3, the pattern "ab" has a metric value of 4 (i.e., 2×2) but does not match the input string "abc" because the pattern does not have all the characters that appear in the string. Accordingly, this pattern is not a match. The pattern "ab*" does match the pattern "abc". The metric value of this match is calculated as follows. The pattern "ab*" has only one substring (i.e., "ab") with a value of 2 and, therefore, the sum of all substrings results in a metric value of 2. Thus, pattern string 100b (i.e., "ab*") matches the input string 120 and the match has a metric value of 2. The pattern string 100c (i.e., "abc") also matches the input string 120 "abc". Because the pattern string 100c does not have a wildcard 106, the metric value of the pattern is 6, i.e., twice the number of characters in the pattern. Accordingly, although both the pattern strings 100b and 100c match the input string 120, the pattern string 100c is considered the best match to the input string because it has a higher metric value.

If there are two pattern strings that have the same metric value with respect to an input string, in one embodiment the best matching pattern is determined by comparing the substrings of the two patterns in ascending order and the pattern with the higher substring value is the better match. For example, if two patterns with the same metric value match an input string but one pattern has a substring$_1$ value of 3 while the second pattern has a substring$_1$ value of 2, the first pattern is the better matching pattern. If substring$_1$ of both patterns have the same value, then the same comparison is performed with respect to substring$_2$ and so on until the better match is found.

It is to be understood that when the metric value of patterns is found according to the method and system of the present invention, the best match to an input string may be defined in any desired way. In an alternative embodiment, for example, if two patterns that match an input string have the same metric value, the best match may be found by comparing the substrings of the patterns in descending order. As another example, the best matching pattern from among a plurality of matching patterns may be defined as the pattern with the lowest metric value. Accordingly, the manner in which the metric value of a pattern (found in accordance with the invention) is used to compare an input string to one or more predefined patterns is not limited in any particular manner.

Referring back to FIG. 2, the pattern 100 may also, but is not required to, include additional user defined and added information. The user may be a human or another computer, routine or automated process. The invention is not limited by how the user defined information is created. The user defined information may include a client ID (or handle) 110. The client ID 110 identifies the source of the pattern, i.e., the user that created the pattern. The pattern 100 may also include one or more pieces of data 114. The data 114 may consist of any information desired by the user. For example, the data 114 may consists of routing information that determines where messages or packages should be sent once the pattern 100 is identified by the matching engine of the invention. Alternatively, the data 114 may include a routine or program that is run once the pattern 100 is identified. As another alternative, the data 114 may include information that is returned to a user who inputted the string that matched to the pattern 100. Alternatively, the data 114 may consist of pointers to routing information, a procedure or program, or other information.

The structure of the pattern 100 allows the matching engine 122 to be used to take further action based on the data 114 attached to the pattern 100. For example, the matching engine may be used in a Real-Time Communication (RTC) server to direct users to a particular server or destination. In one implementation, for example, a pattern 100d may consist of ("a*", "Server A"), wherein "a*" is the pattern string 102 and "Server A" is the user added data 114. Specifically, "Server A" includes the data needed to direct a request or other information to a Server A. Additionally, a pattern 100e may consist of the pattern string and information ("b*", "Server B"), and a pattern 100f may consist of the pattern string and information ("*", "Server C"). If a request is received from a user who is identified by the string "andy", for example, the matching engine determines that both the pattern strings "a*" and "*" match the input string "andy." Given that the best match is defined by the pattern string "a*" the request from user "andy" is directed to Server A.

In another embodiment, the matching engine may be used to determine all patterns that match the input string. In this embodiment, all pattern strings 100 that match the input string 120 may be identified and provided to the requester, a user or additional routine, program or component. Additionally, in the implementation of the patterns 100 in which the patterns include a client ID 110, the matching engine may be used, for example, to identify all patterns that match a specific input string and were created by a specific client ID.

The pattern 100 may include more than one data 114. Although FIG. 2 depicts a pattern 100 that contains data 114a and 114b, the number of different data structures that are included in the pattern 100 as data 114 is unlimited. If the pattern 100 includes more than one data 114, the information may be of different data types. For example, data 114a may include data structures regarding routing information to Server A, whereas data 114b may include data structures regarding running a particular routine or program module. If more than one data 114 is included in the pattern 100, then the pattern 100 may also include a metric 112 that allows a user to determine which of the data 114 attached to the pattern 100 is the best information. The data 114 and metric 112 that may be included with a pattern 100 allow the matching engine of the present invention to be extremely robust. Once the best pattern is determined using the steps set forth above, any other user, program module, routine and/or automated process may use the data 114 attached to the pattern to perform further processing.

Figure 6:
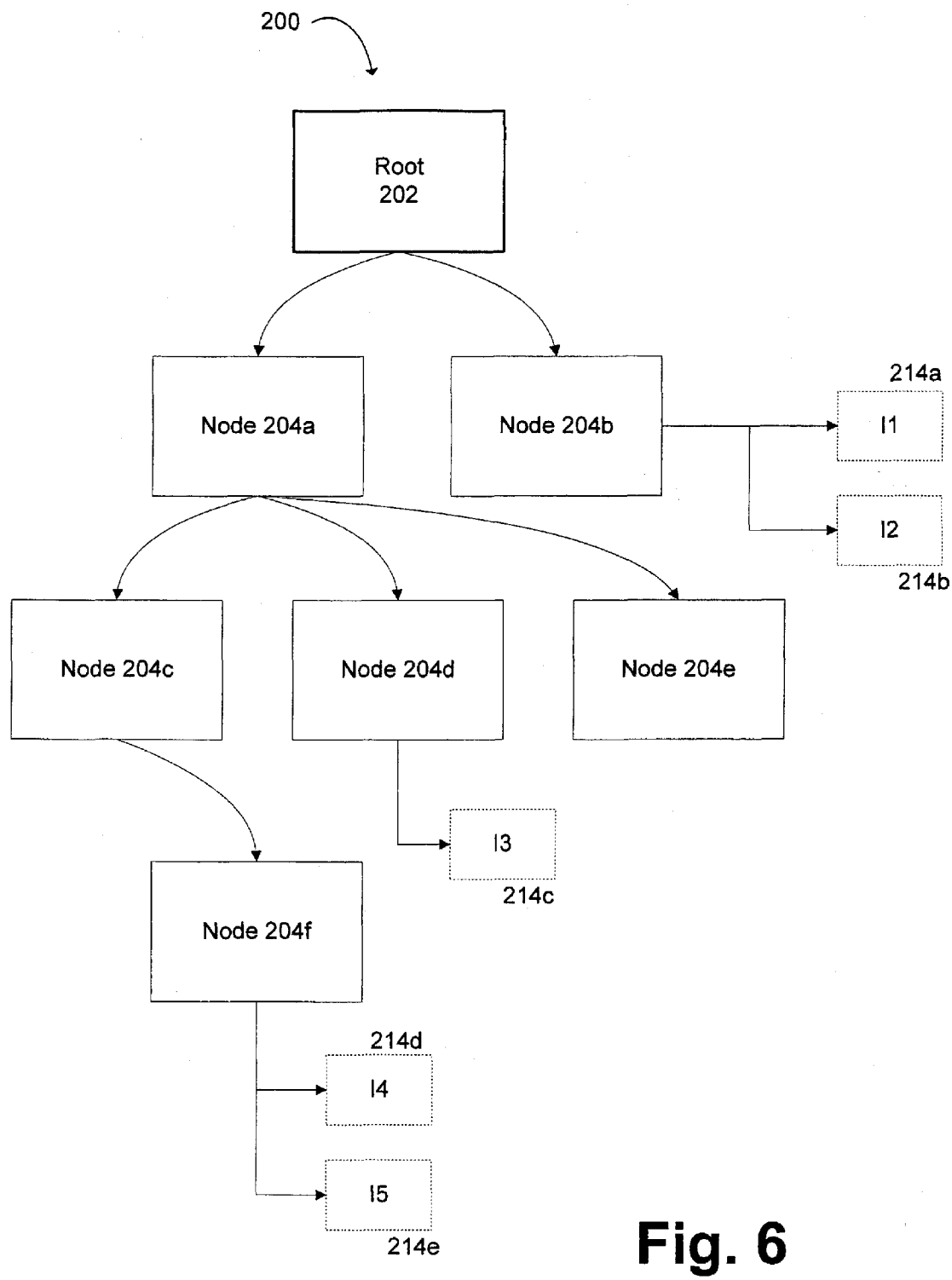
FIG. 6 is a block diagram of a matching tree according to one implementation of the invention.

As shown in FIG. 6, in one embodiment of the invention, the patterns 100 are organized in a tree structure. Generally, the tree 200 is comprised of a root 202 and one or more nodes 204a to 204n, wherein the subscript n indicates that the tree may have an unlimited number of nodes. Each node 204 may also include one or more pieces of additional data 214.

Figure 7:
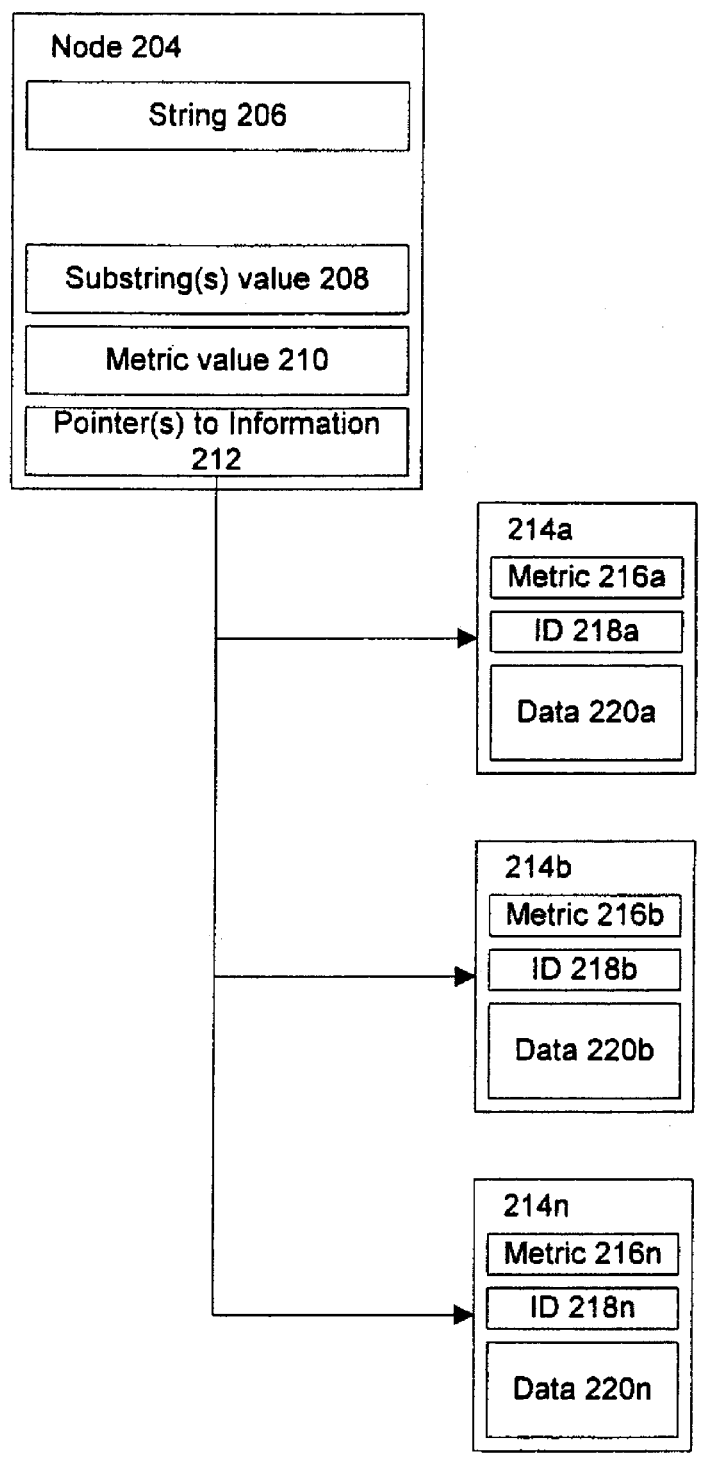
FIG. 7 is a block diagram of the structure of a node in the matching tree.

The structure of the nodes 204 and additional data 214 is discussed further with reference to FIG. 7. In one embodiment of the invention, the node 204 is comprised of a string pattern 206, substring values 208 for one or more substrings, a metric value for the pattern 210, and one or more pointers 212 to one or more additional data 214a through 214n, wherein the subscript n indicates that the number of additional data associated with a node is unlimited. Nodes in the tree may have parent and child relationships with other nodes in the tree. For example, in the general implementation depicted in FIG. 6, node 204a is the parent of node 204c, and node 204f is the child of node 204c. In one implementation of the tree, the tree is constructed to minimize the size of the tree. Accordingly, to the extent possible pattern strings are consolidated into nodes that are closest to the root 202.

The data 214 that may be associated with each node 204 may be comprised of a metric value 216, an ID 218 and the data 220. The metric value 216 helps a client, user, program module, process or the like evaluate the importance of the data 214 vis a vis other data 214 that may be associated with the node 204. The metric value 216 is set by a user, automated process, program module or the like. Accordingly, the metric value does not affect the performance of the matching engine per se. Rather, the metric value 216 affects the order in which data attached to the pattern may be accessed and/or used once the pattern is matched to an input string using the matching engine of the present invention.

The ID 218 of the data 214 identifies the client, user, program module, process or the like that associated the data 214 with the pattern represented by the node 204. Finally, the data 220 represents the actual information. As previously discussed, this data 220 may be any appropriate information such as routing information, a program module, pointers, etc.

Figure 8:
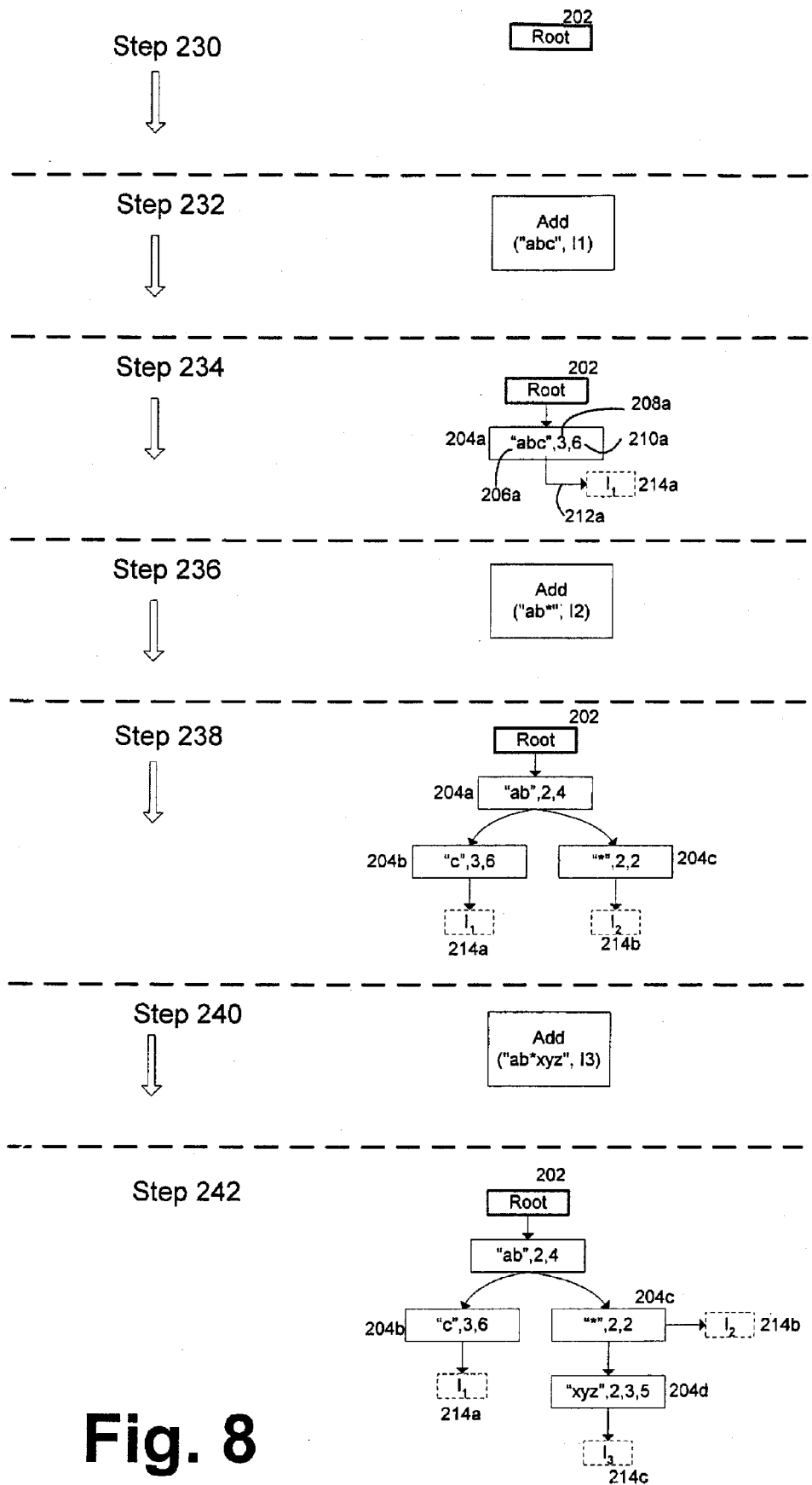
FIG. 8 is a flow diagram of the steps performed to build a matching tree.

The manner in which a tree for use within the invention may be built is discussed with respect to FIG. 8. At step 230 no patterns have been created or entered into the tree and the tree is comprised only of an empty root 202. At step 232, the pattern ("abc", $I_1$) is added to the tree, wherein It is the additional data associated with the pattern. Consequently, at step 234 node 204a is added to the tree 200 to add this pattern to the tree. Because the pattern string 206a ("abc") does not have a wildcard in the pattern, the pattern has a substring value 208a of 3 and a metric value 210a of 6. (For the purposes of this example, the client ID 218 is not discussed or shown in FIG. 8.) The node 204a also has a pointer 212a to additional data ($I_1$) 214a. At step 236, the pattern ("ab*", $I_2$) is added to the tree. To add this pattern to the tree, at step 238, nodes 204b and 204c are created. Because the patterns "abc" and "ab*" share the same two characters "ab", the characters "ab" are maintained at node 204a in the tree. As node 204a now contains a string with no wildcards and only two characters, the sole substring value 208a is changed to 2 and the metric value 210a is changed to 4.

Nodes 204b and 204c are children of node 204a, which means that the patterns represented by these nodes share characters with node 204a. Node 204b contains the substring 206b "c", which together with node 204a comprise the string "abc". Because the string represented by node 204b also does not have any wildcard characters, the sole substring value 208b is 3 and the metric value 210b is 6. Node 204b also has a pointer 212b to additional data ($I_1$) 214a. Node 204c contains the substring "*", which together with node 204a comprise the string "ab*". As indicated at node 204c, the string "ab*" has one substring value 208a of 2 and a metric value of 2. Node 214c also has a pointer 212c to additional data ($I_2$) 114b.

At step 240 the pattern ("ab*xyz", $I_3$) is added to the tree 200. At step 242, node 204d is added to the tree 200 as a child to node 204c. As indicated in FIG. 8, the pattern "ab*xyz" has two substrings 208d with values of 2 and 3, and a metric value 210d of 5. Node 204d also includes a pointer 212d to the additional data ($I_3$) 214c.

If a pattern is ever deleted from the tree such that a node only has one child, then a collapse operation may be performed on the tree to reduce the size of the tree. For example, assume the following tree structure:

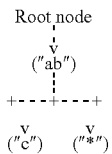

If the pattern "abc" is removed from the tree, the tree could look like:

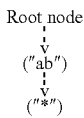

If the tree is collapsed, however, the tree could look like:

The collapsed tree has the advantage of requiring less memory to store and being faster to search.

The matching engine of the present invention, however, is not limited to an implementation using a tree structure. Instead, any organization of the string patterns is permissible so long as the string patterns are searchable by the matching engine. For example, the string patterns may be implemented as a list.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-implemented method of finding a best match to a string of characters from multiple string patterns; the method comprising:
   comparing the string of characters to each of the multiple string patterns to determine which of the multiple string patterns the string of characters matches, wherein the string patterns include wildcard characters so that one or more of the multiple string patterns match the string of characters;
   based on the comparison, determining a quality of the match between the string of characters and each matching string pattern by computing a metric value that scores the quality of the match;
   wherein the metric value is computed using substrings of the string of characters, the substrings being separated from one another by a wildcard character;
   wherein, the metric value for the string of characters is determined by summing a value associated with each of the substrings separated from one another by a wildcard character in the string of characters;
   selecting from the matching string patterns a matching string pattern as the best match based on the determined quality of the match; and
   reporting the selected matching string pattern.

2. A system for finding the best match to an input string from multiple string patterns, the system comprising:
   a data store containing the string patterns;
   an input component configured to receive an input string;
   a matching engine configured to:
      compare the input string to the multiple string patterns of the data store to determine which string patterns the input string matches,
      wherein the string patterns contain wildcard characters so that one or more of the multiple string patterns match the input string;
      compute a metric value that scores the quality of the match to determine a quality of the match between the input string and each matching string pattern based on the comparison;
      wherein the metric value is computed using substrings of the input string, the substrings being separated from one another by a wildcard character;
      wherein, the metric value for the string of characters is determined by summing a value associated with each of the substrings separated from one another by a wildcard character in the input string;
      select from the matching string patterns a matching string pattern as the best match based on the determined quality of the match;
   a results component configured to report the selected matching string pattern.

3. A computer-readable storage medium encoded with instructions for controlling a computer system to find a string pattern of multiple string patterns that best matches an input string, by a method comprising:
   for each string pattern:
      comparing the input string to the string pattern to determine whether the input string matches the string pattern;
      when it is determined that the input string matches the string pattern, determining quality of the match between the input string of characters and the string pattern by computing a metric value that scores the quality of the match;
   wherein the metric value is computed using substrings of the input String, the substrings being separated from one another by a wildcard character;
   wherein, the metric value for the string of characters in the input string is determined by summing a value associated with each of the substrings separated from one another by a wildcard character in input string;
   selecting from matching string patterns a matching string pattern as a best match based on the determined quality of the match;
   providing an indication of the selected string pattern.

4. The method of claim 1 wherein the quality of the match is determined for a particular string pattern based on a number of non-wildcard characters in the string pattern that match the string of characters.

5. The method of claim 1 wherein a string pattern is associated with a handle that identifies a client that added the string pattern to the multiple string patterns for notifying the client when the string of characters matches that string pattern.

6. The method of claim 1 wherein each string pattern is associated with routing information, and the method further comprises routing a packet based on the routing information for the selected matching string pattern.

7. The method of claim 1 wherein reporting the selected matching string pattern comprises sending information about the selected matching string pattern to a program module.

8. The method of claim 1 wherein the string patterns are stored in a collapsed tree structure.

9. The system of claim 2 wherein the matching string pattern that best matches the input string is the one with a metric value that indicates best quality of the match.

10. The system of claim 2 wherein the determined quality of a match is based on non-wildcard characters that the input string and the string character have in common.

11. The computer-readable medium of claim 3 wherein the quality of the match is determined for a particular string pattern based on a number of non-wildcard characters in the string pattern that match the input string.

12. The computer-readable medium of claim 3 wherein a string pattern is associated with an identifier of a client that is notified when the string pattern is selected as the best match for the input string.

13. The computer-readable medium of claim 3 wherein a string pattern is associated with routing information, and the method further comprises routing a packet associated with the input string based on the routing information that is associated with the selected string pattern.

14. The computer-readable medium of claim 3 wherein the providing of an indication includes sending information about the selected string pattern to a program module.

15. The computer-readable medium of claim 3 wherein a string pattern is associated with additional user-defined information.

16. The computer-readable medium of claim 3 wherein a string pattern is associated with a program that is executed when the string pattern is selected as the best matching string pattern for an input string.

\* \* \* \* \*